United States Patent [19]
Banner

[11] 3,914,994
[45] Oct. 28, 1975

[54] LIQUID FLOW INDICATING AND FLOW CONTROL MEANS

[76] Inventor: Philip M. Banner, 28 Oxford Road, Massapequa, N.Y. 11758

[22] Filed: Feb. 11, 1974

[21] Appl. No.: 440,992

Related U.S. Application Data

[63] Continuation-in-part of Ser. No. 208,072, Dec. 15, 1971, Pat. No. 3,793,997.

[52] U.S. Cl. .................. 73/118; 73/228; 137/554
[51] Int. Cl.² ........................................ G01M 15/00
[58] Field of Search ......... 137/554, 486; 123/41.15, 123/41.06; 73/199, 118, 228; 340/239 R

[56] References Cited
UNITED STATES PATENTS

| | | | |
|---|---|---|---|
| 2,513,863 | 7/1950 | Havens | 340/239 R X |
| 3,113,189 | 12/1963 | Porwancher | 340/239 R X |
| 3,196,900 | 7/1965 | Catheron et al. | 137/486 X |
| 3,257,643 | 6/1966 | Jensen | 340/239 R X |
| 3,477,289 | 11/1969 | Wiebe | 73/198 |
| 3,720,747 | 3/1973 | Anderson et al. | 174/112 UX |
| 3,724,269 | 4/1973 | Rosaen | 73/228 X |
| 3,739,366 | 6/1973 | Lace | 340/239 R |

*Primary Examiner*—Jerry W. Myracle

[57] ABSTRACT

Liquid flow sensors connected to flow indicating and control means for determining the liquid flow condition of a fluid system and controlling said systems liquid movement, responsive to an alarm stage and having visual and automatic advantages providing the necessary level of communications in the application of fluid handling such as oil, gas, water and other forms of energy.

8 Claims, 4 Drawing Figures

LIQUID FLOW INDICATING AND FLOW CONTROL MEANS

This application is a continuation in part to my prior application Ser. No. 208,072 filed 12-15-1971, now U.S. Pat. No. 3,793,997.

That patent application shows an ENGINE LIQUID FLOW INDICATING MEANS. The present application is an improvement in the indicating of liquid flow conditions of fluid systems that include gas, oil, water and many other forms of energy that are of liquid composition. It is also an improvement as a monitoring device that shows the specific condition responsive data on particular gauges or data readouts on the amount and condition of water or liquid flow, the amount of pressure in the system each having an indicating pointer accordingly. It shows the speed of motorized means when the device is used with a pump or any form of engine so that the information on speed, pressure, water flow volume or liquids volume movement, are all the important factors involved and compiled in one device. In addition to the other improvements, this application covers the control of liquids rather than just the sensing and indicating of liquid flow and therefore it shall be useful in controlling various liquids and energies and in some cases providing the necessary pressurization of a liquid system in accordance with manufacturers systems specification. It also shows improvement in covering the use of liquid flow controls on all kinds of engines and motors in addition to industrial application of fluids handling and fluids transportation. This would cover electric and steam motors, rotary engines, turbine and jet engines, extending their life expectancy through liquid flow control where an operator can take preventative action to prevent downtime or the loss of equipment due to liquid flow failures. It will provide additional safety when used with the improved signal responsive means now incorporated in the gauges which can provide visual or automatic means of indicating low warning that can turn on an alarm or shut down the equipment automatically to a slower position when used with a governor of speed or shut off entirely until corrected. Although not shown in the drawing, the system of this invention would further be employed in providing communication to a central source so that the condition would automatically be reported that would be important in instances where an oil line stopped flowing from a supply source, water to sprinklers, water to professional firefighters working from various sources that would require time to find the source of trouble, water cooling on airconditioners, electric motors and engines stationary and moving where water or other liquid flow is important. It would also prevent the loss of prime in pressurized systems by having these control advantages built into the systems. As means As a conservation of oil it would save oil by removing the overheating of industrial and other water cooled engines merely by being condition and indicating and control responsive. The flow of liquids in pipes, boilers and engines and the general transportation of fuels and fluids requires efficient flow control and indicating systems of the type that act preventatively to safeguard life and equipment and preserves our precious energy stockpiles.

More particularly, the present invention provides an improved liquid flow control means that features a whole new concept in gauges and indicating means for analyzing liquid flow conditions and further to control them through liquid control and improved signal responsive means. The specific embodiments of this invention comprise new condition responsive means employing simple and economical methods of design and parts using magnetic and resistive wiring switches to measure water and other liquids flow and reliably transferring this information through an electrical circuit all color coded to the responsive gauges for visual control. The warning system employed here is extremely important, it immediately senses an improper fluid condition visually and automatically becomes signal responsive. Further, the gauges used in this invention could electronically sense any predetermined differential characteristics that imply a malfunction by having coordinated relays built into the gauges so that they would sense the condition shown on the gauge in comparison to the position it should be in according to the pressure or the speed of the driving force or the combination of all the indicators. A manual means of detecting malfunction exists for the operator, the inside flow gauge disc is marked for illustration with four makings showing A (alarm) low, normal and high. The other gauges are stationary too, each of them having in common their moving pointers commonly found on all gauges. Therefore, the information from the inside gauge shows what is normal low or high for all gauges respectively and one can easily determine the need for maintenance according to the information. The radially disposed peripheral characteristics improves the analytical values necessary for preventative maintenance on various systems that would prevent total breakdown and loss of capital equipment and sometimes producing an avoidable safety factor. The readout of information on the gauges is not limited to this one type of gauge arrangement illustrated, the invention can also provide temperature readouts, viscosity and density factors on data readout electric controls.

Accordingly, a principal object of the invention is to provide new and improved Liquid Flow Control Means.

Another object of the invention is to provide new and improved liquid flow control indicators to monitor the information relative to volume, pressure, speed, temperature, viscosity and other important factors found in fluid systems.

Another object of the invention is to provide new and improved sensors mounted in liquid communication with said fluid systems.

Another object of the invention is to provide new and improved fluid control devices that would limit the amount of fluids volume and pressure according to the specific needs of a system where a supply of fluids must be limited to the use.

Another object of the invention is to provide new and improved sensor body means conducive to adaptation to pipes, hoses through clamping on or by threaded means for temporary or permanent operations.

Another object of the invention is to provide new and improved condition responsive lights and alarms employing visual and audio means of communications, detecting malfunctions and reporting same.

Another object of the invention is to provide new and improved liquid flow control means that would be useful to conserve loss of energy when breakage would occur in the transportation phase of energy materials, or in a moving electric motor or engine overheating due to improper flow of coolants causing an unsafe condition and literally burning up unnecessary fuel and the engine itself.

Another object of the invention is to provide new and improved automatic condition responsive means to automatically alter the speed of a pump, engine or other equipment and if necessary shut-down same, and providing a safe warning system.

Another object of the invention is to provide a data readout control that would replace the gauges with equal information in a solid state form.

Another object of the invention is to provide new and improved circuit wiring having color coded wiring and color coded switch attachments for easy installation.

Another object of the invention is to provide new and improved liquid flow controls having battery or alternating current power to operate it efficiently on boilers at sea and on land, on motors, on pipes and hoses for all uses.

Another object of the invention is to provide new and improved liquid flow controls that operate on other than electrical means of power or partial electric means of power by using mercury operated gauges or other type of equipment, to produce the embodiment of this invention and the result therein.

Another object of the invention is to provide new and improved liquid flow control having visual and electronic and mechanical advantages in combination with indicators, controls, sensors, switches, wiring that would indicate and control liquid systems.

These and other objects of the invention will be apparent in the following specifications and drawings, of which:

Figure 2:
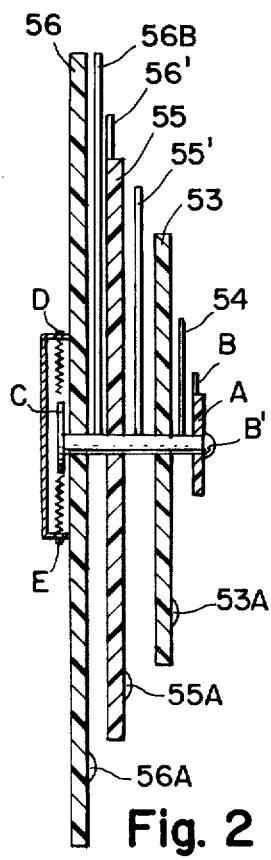
FIG. 2 is a cross sectional view of the embodiments shown in FIG. 1.
Figure 1:
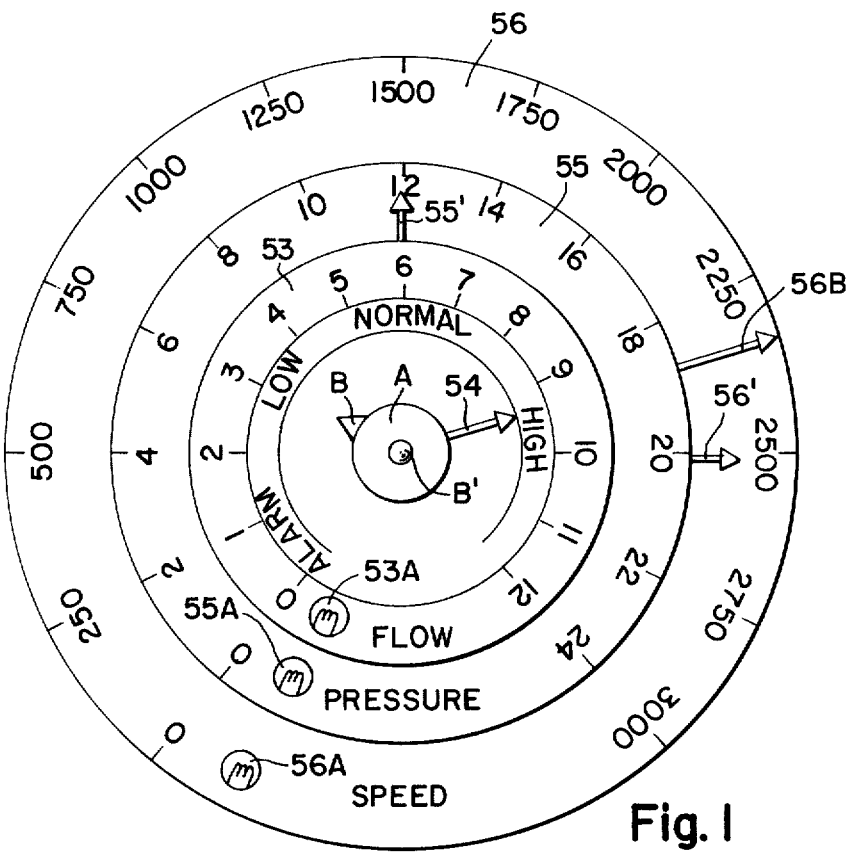
FIG. 1 is a front plan view of the indicators gauges and water flow control in radial form.

Referring to the FIGURES, FIG. 1 shows a monitoring and indicating flow control group gauge unit in radial form comprising in its center a flow control rotating disc A having a movable pointer B turned by a knob B' so as to position the pointer B' in many positions and shown in the illustrated drawing in four positions alarm, low, normal and high. In the rear of the gauge which is shown in FIG. 2 there is a resistance wire that transmits current to a liquid control that will be further explained in the figures. The markings alarm, low, normal and high are placed upon a liquid flow gauge 53 having a flow gauge movable pointer 54' and a flow low warning light circuit means 53-A showing the movable pointer 54 pointing to numbers marked around the periphery of the gauge 53 that line up radially with the pressure indicating gauge 55 and the speed gauge 56 above it. The pressure indicating gauge 55 shows a movable pressure indicator pointer 55' and a low pressure warning light circuit means 55-A and a pressure indicator gauge shows as an example divisions of numbers shown on its periphery indicating pressure from zero (O) to 24 psi. A revolutions per minute gauge 56 has an indicating pointer 56' that shows on the periphery of the gauge 56 having numbers corresponding to the speed of the driving force such as a motor driven pump, a gas or diesel engine, a electric motor, a jet or turbine engine, a rotary engine or other means of power. The gauges can be adjusted for calibration and if needed each gauge mentioned could have its own markings individually for alarm, low, normal and high or they can all read out in numbered form if desired. On the speed gauge 56 there is another pointer 56-B for signal purposes that is signal responsive to any desired speed requirement whereas any speed less than required would cause a signal. In this manner we can safeguard the even flow of fluids by maintaining the required power level for pressure, for flow and for general control. If required, the flow control gauge 53 and the pressure control gauge 55 along with the speed gauge 56 can each have its own signal pointer and signal alarm means. The lights shown in FIG. 1 are illustrated as low limit lights 53-A on the flow control gauge 53, 55-A on the pressure indicator gauge 55, and 56-A on the speed gauge 56. The combination of advantages are numerous offering indicating the control means of fluid control systems where a knowledge of flow, pressure, speed and control of said fluids is desirable. Former art devices and gauges do not indicate and control fluids which can be extremely important in conserving energy, particularly the fluids comprising heating oils, engine fuel, flow of water or chemicals in plants where this analytical device will provide the necessary level of communication in addition to having preventative benefits in maintenance of fluid systems and preserving their lift expectancy. Although not shown in the drawings, a shut down emergency switch has been mentioned in the specification referring to automatic shutoff which in an emergency would cut off the power or the supply and signal an alarm. The individual and collective advantages are considered unobvious to the present art and sorely needed by industry for conservation of power and fluids.

FIG. 2 shows the cross sectional view of the parts of FIG. 1 with the added exception of the control C placed on the back of the last gauge, the speed gauge 56. It is shown having two switch terminals D & E respectively that would be connected to the sensor switch housing terminals in FIG. 4 by color coded wiring to color coded terminals for easy installation. The electrical power source is not shown which can be batteries or supplied current that is then connected with the indicating and control means to the sensing means.

Figure 3:
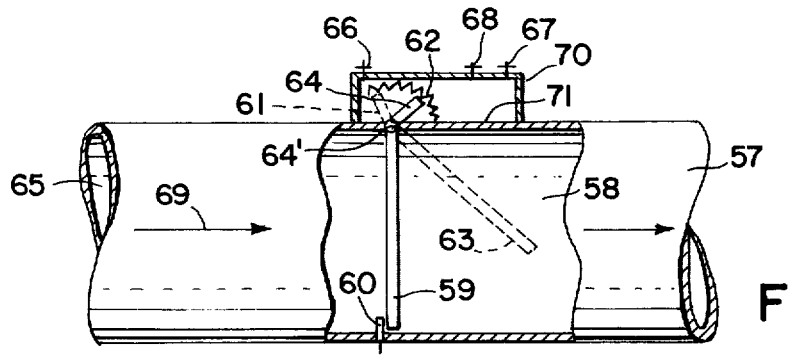
FIG. 3 is a front plan view of a sensor body means showing sensors, switches and circuit wiring in one preferred form.

FIG. 3 shows a sensor body 57 having a cutout view 58, a flapper switch valve 59 with a no flow signal switch 60, a resistance arm contact linkage 61 contacts resistive wire 62 signalling the flow position of the flapper valve 59 which is responsive to the volume of fluid flow in terms of quantity. It shows a illustrative position of the flapper valve switch 63 and an illustrative position of the resistive arm contact linkage 61, the pivot 64' also includes a watertight means not shown in the drawings. The fluid passageway 65 and a flow switch terminal 66 along with a pressure switch 67 and a ground contact terminal 68 are all located on the sensor switch housing 70 shown in one of many positions, on top of the sensor body means 57. Although illustrated this way the pressure switch and the flow switch can be placed remotely into any fluid system in individual parts rather than as one integral assembly. The direction of flow 69 is marked by an arrow accordingly, the sensor switch housing 70 has a sensor housing fluid seal 71 which can also be provided in many forms to seal the fluids from the resistance wire 62 or potentiometers if elected for use. A flapper valve switch contact arm 64 is shown making contact with the resistance wire 62 providing the circuit signal response necessary for the invention. The size shape and form of the sensor body means 57 is shown in limited potential which is totally unrestricted to size, shape and form or materials to construct same with.

Figure 4:
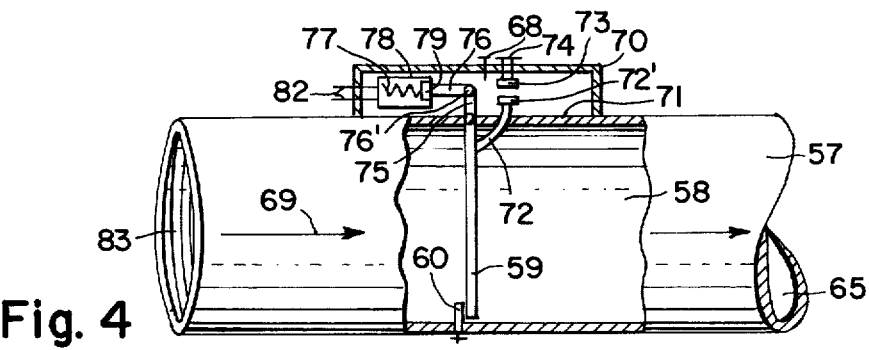
FIG. 4 is a front plan view of another sensor body having sensor, switches and circuit wiring in another form that also embodies the liquid controls for controlling liquid flow.

FIG. 4 shows a slightly different arrangement of a sensor switch housing 70 having a sensor housing fluid seal 71, a flapper valve switch contact arm 72 having magnetic switch contact 72' in the form of a similar magnet which will naturally repel its counterpart magnet switch 73 shown illustrated attached to the flow-switch 74 in one of many means of attachment. The movement of the flapper valve switch 72 will cause the magnet 72' to repel the magnet 73 and thereby actuating a potentiometer or resistance wire switch 74, or a mechanical arrangement of switches to open or close a electrical circuit so as to become signal responsive to fluid conditions and operating the indicating and control means of this invention. The flapper valve arm contact 75 is connected to the flapper valve 59 in this illustration, connecting to a connecting rod 76 by a locking pin 76' to the arm contact 75 connected to a spring 77 representing an electric valve within a housing 78. An adjustment tightening nut 79 is placed upon the threaded end of the connecting rod 76 and placed within the control valve housing 70 which includes wiring 82 to operate the control valve. The threaded end of the fluid passageway 83 is also shown although the manner of attachment need not be by threaded means or clamp means.

The discussion within the explanation of the Figures have merely touched upon the control facility provided by this invention. In one form this invention serves as an efficient indicating and monitoring means in fluid systems analyzing flow, pressure and speed of power means, while in another form, conversely, it presents a whole new concept in fluid controls by actually controlling the desired amount of fluids to flow for any purpose. By setting the requirements on movable disc A shown in FIG. 1 it would cause the switch terminal D and E to signal and operate the control valve housing 70 by energizing coil 77 that operates the connecting rod plunger 76, placing pressure against the flapper valve arm contact 75 which in turn will restrict the movement of the flapper valve 59 to the required setting. Therefore, we can then operate the flow to any requirement either by manual or automatic means. Such automatic means will be accomplished by the control valve coil 77 operated by the disc A and the pointer B. The calibration to set the proper position of the gauges would be made by adjustments at the control valve and at the sensor body means where provisions for adjustment has been provided. The gauges will also be of adjustable quality so that all manufacturers recommended specifications can be built into the device accordingly. In cases where priming of fluids or pressurizing is important the operator would set the controls to the desired flow by checking the flow and pressure gauges accomplishing his objectives. The warning devices built into this invention are relatively important because it has the ability to warn the operator of an existing condition prior to becoming a serious problem. If necessary in certain instances to shut down equipment a provision will be provided to cut the circuit of the motor means. The features of this invention will have great impact on saving equipment, saving valuable loss of fluids, and will be of value industrially to the business community.

The illustrative drawing of FIG. 1 illustrates the following example; The flow control selector disc A has been turned to place the pointer B to "low". The flow gauge 53 has its pointer 54 in the position of 9 gallons per minute. The pressure gauge 55 has its pointer 55' placed at "12" pounds of pressure per square inch. The speed and RPM gauge 56 has its pointer 56' at approximately "2500" RPM. The speed limit pointer 56-B has been set at approximately "2300" RPM. Therefore, the device has been set to deliver low volume, the flow rate is 9 PGM, the pressure is 12 PSI, the speed of the motor at 2500 RPM, and the low limit setting is set at approximately a 2300 RPM minimum at which time the device will become signal responsive to a fluid system condition requiring assistance.

The no flow switch of FIGS. 3 & 4 has an insulated ground terminal 60 that is signal responsive when the ground circuit connected to the ground terminal 68 makes contact with the flapper valve 59 and then comes in contact with ground terminal 60 completing the ground alarm no flow signal. If the flapper valve 59 were made of non-metallic materials the flapper valve would contain circuit wiring so as to render the same operation as if it were made from metals. The flapper valves 59 swing in the illustration on a pivot pin 64' shown in FIG. 3. The other electrical circuit signal means shown responds to the movement of the flapper valve switch contact arm 64 shown in FIG. 3 and from magnetic switch movement of switches 72 & 73 of FIG. 4 that acts upon another switch 74 that transmits the proper current to operate the indicating gauges of this invention.

While I have described a preferred form of my invention, it is to be understood that the form shown herein is illustrative only, and that the invention contemplates all forms of apparatus that may fall within the scope of the appended claims.

I claim:

1. A liquid flow device for determining the liquid flow condition of a fluid system comprising, a sensor body mounted in liquid communication with said system, a signal responsive element mounted on said sensor body producing a first signal means, a signal control circuit connected to first signal means indicating said condition of said fluid system, a adjustable flow control means connected to said signal responsive element to indicate and control said flow condition.

2. A liquid flow device as set forth in claim 1 wherein said liquid flow condition the qualitative measurement from no flow to maximum flow in a fluid system.

3. A liquid flow control as set forth in claim 1 wherein said liquid flow measures the specific flow of liquids and said flow pressure in said sensor body.

4. A liquid flow device as set forth in claim 1 wherein said liquid flow system is connected to said signal responsive element providing a warning and alarm means connected by said signal control circuit to first sensing means and to alarm and warning means.

5. A liquid flow control as set forth in claim 1 having indicating gauges wherein said control is used for the combination of measurement and control of fluid systems in cooperation with said indicating gauges and flow control means.

6. A liquid flow control as set forth in claim 1 having flow, pressure and speed gauges wherein said control works in combination with said flow pressure and speed gauges having visual and electronic means of warning when a malfunction occurs.

7. A liquid flow control device as set forth in claim 6 wherein said control comprises having settable flow control levels for minimum required flow, pressure and speed and warning indicator lights cooperating with said gauges.

8. A liquid flow control device as set forth in claim 6 wherein said rotatable flow control switch is mounted in combination with one or more of said gauges responsive to measurement and control of liquid flow.

* * * * *